T. B. JEFFERY, DEC'D.
K. E., C. T. & H. W. JEFFERY, EXECUTORS.
VEHICLE WHEEL.
APPLICATION FILED SEPT. 17, 1908.
1,013,295.
Patented Jan. 2, 1912.
2 SHEETS—SHEET 1.
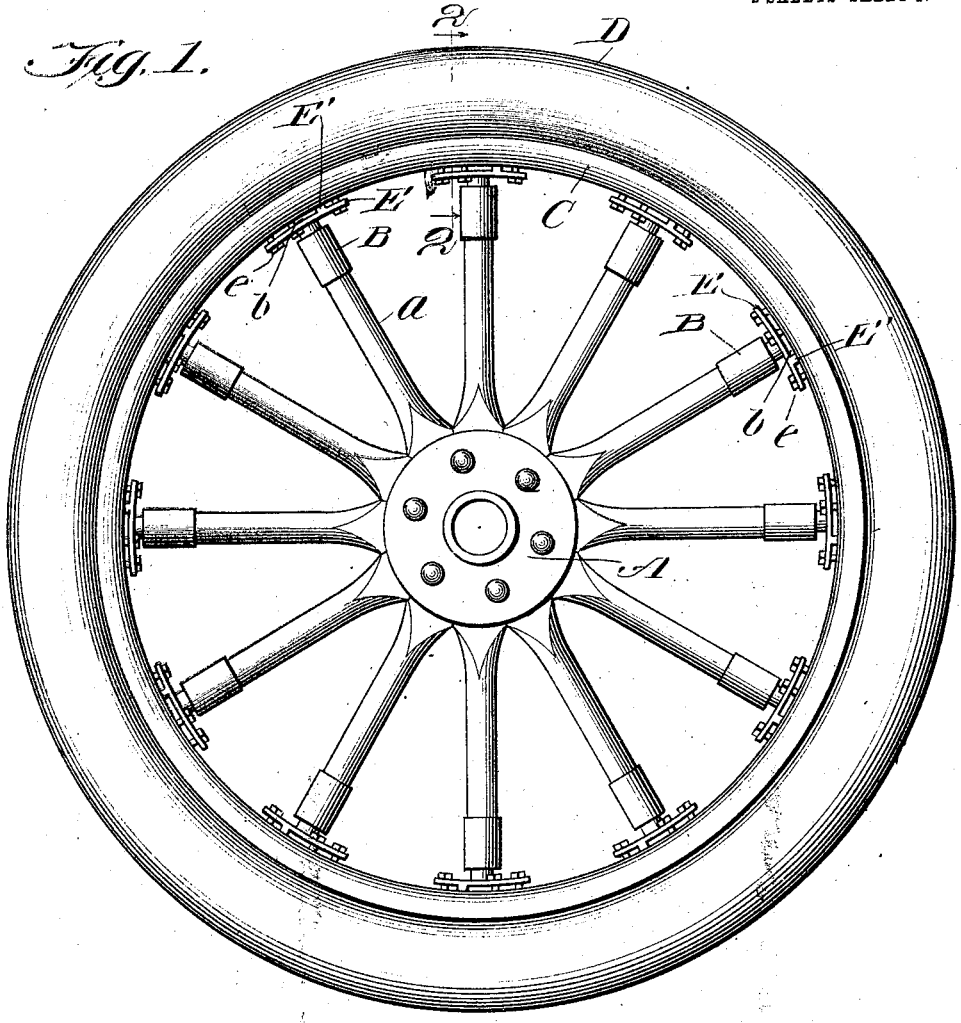
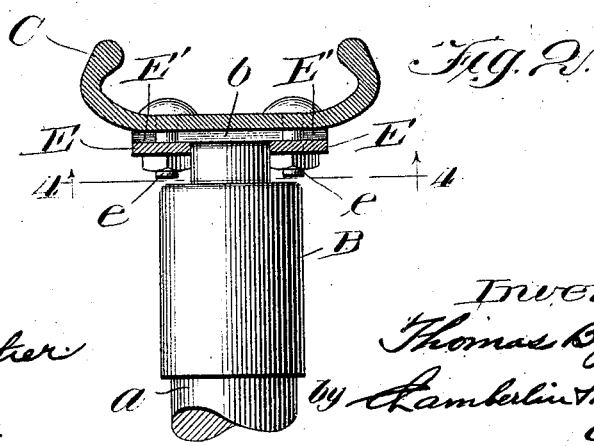

T. B. JEFFERY, DEC'D.
K. E., C. T. & H. W. JEFFERY, EXECUTORS.
VEHICLE WHEEL.
APPLICATION FILED SEPT. 17, 1906.
1,013,295.
Patented Jan. 2, 1912.
2 SHEETS—SHEET 2.
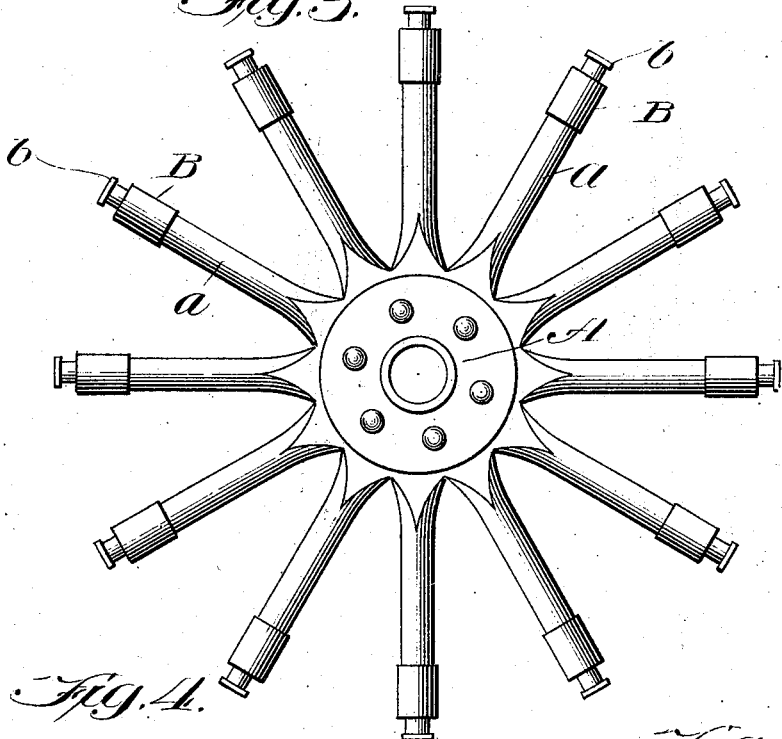
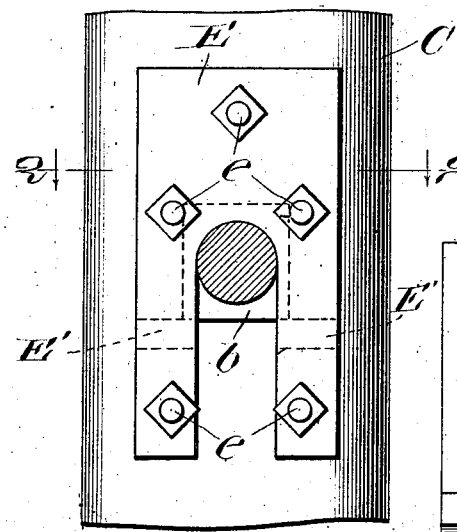
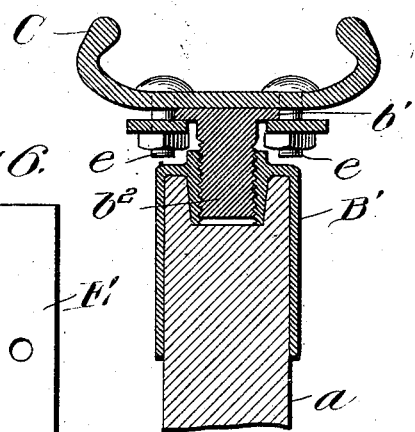
Witnesses:
Harry S. Gaither
Ruby V. Nash
Inventor:
Thomas B. Jeffery
by Chamberlin & Wilkinson
Att'ys.

UNITED STATES PATENT OFFICE.

THOMAS B. JEFFERY, OF KENOSHA, WISCONSIN; KATE E. JEFFERY, CHARLES T. JEFFERY, AND HAROLD W. JEFFERY, EXECUTORS OF SAID THOMAS B. JEFFERY, DECEASED.

VEHICLE-WHEEL.

1,013,295. Specification of Letters Patent. Patented Jan. 2, 1912.

Application filed September 17, 1906. Serial No. 335,022.

*To all whom it may concern:*

Be it known that I, THOMAS B. JEFFERY, a citizen of the United States, residing at Kenosha, county of Kenosha, State of Wisconsin, have invented a certain new and useful Improvement in Vehicle-Wheels, and declare the following to be a full, clear, and exact description of the same, such as will enable others skilled in the art to which it pertains to make and use the same, reference being had to the accompanying drawings, which form a part of this specification.

My invention relates in general to vehicle wheels and more particularly to a detachable pneumatic tire rim.

In the use of pneumatic tires inconvenience and labor are occasioned by punctures, as it is then necessary to remove the tire from the rim and secure thereon a new tire, or when a double tube tire is used it is necessary to detach the outer casing from the rim and to remove and repair the punctured one, after which the tire must be inflated. Considerable time and trouble are consequently occasioned by the puncture of any form of pneumatic tire at present on the market.

The primary object of my invention is to provide a vehicle wheel around which a fully inflated pneumatic tire may be quickly and easily secured, thereby avoiding the necessity of repairing a punctured tire on the road and of inflating the repaired tire or a new one substituted for the punctured tire.

A further object of my invention is to provide means for detachably securing a pneumatic tire rim directly to the spokes of a wheel, thereby permitting a flat tire to be readily replaced by a fully inflated tire.

A still further object of my invention is to provide means for detachably securing a pneumatic tire to a vehicle wheel which will be simple in construction, inexpensive in manufacture and efficient in use.

The embodiment of my invention herein disclosed may be generally described as comprising a metal pneumatic tire rim of any suitable construction, adapted to be secured concentrically around the ends of the spokes of a wheel, a plurality of clamping plates secured to the interior surface of the rim and alining with the spokes, and spoke-heads adjustably secured to the ends of the spokes and adapted to be removably secured to the interior surface of the rim by the clamping plates.

My invention will be more fully described hereinafter with reference to the accompanying drawings in which the same is illustrated as embodied in two convenient and practical forms, and in which—

Figure 1 is an elevational view; Fig. 2 an enlarged detail view on line 2—2 Fig. 1; Fig. 3 an elevational view of the wheel, the rim and tire having been removed therefrom; Fig. 4 an enlarged plan view of the under surface of the rim adjacent to one of the spokes, the spoke being shown in section; Fig. 5 a sectional view similar to Fig. 2 showing a modification; and Fig. 6 a detail view of one of the clamping plates.

Similar reference characters are used to designate similar parts in the several figures of the drawings.

Reference character A indicates the hub of a wheel around which radiate spokes $a$. A socket B is secured to the end of each of the spokes $a$ and is provided with a head $b$ projecting radially from the socket and united thereto by a restricted neck.

C indicates a pneumatic tire rim which may be of any desired type, for convenience a clencher type of rim being shown.

D indicates a pneumatic tire surrounding and detachably supported in any suitable manner upon the rim C. So far as my invention is concerned the tire may be of any desired type either single or double tube, and may be secured in any suitable manner to the rim C.

Adjustably secured to the interior surface of the rim C are clamps E adapted to engage the spoke heads $b$ and secure the same tightly to the rim. The clamping plates may conveniently be of the shape shown in detail in Fig. 4 in which an opening is provided extending from one end to the center of each plate, the width of such opening being less than the diameter of the spoke-heads. The clamping plates E may be conveniently secured to the rim C by means of bolts $e$ extending through registering holes in the rim and plates. The heads of the bolts are shown as overlying the outer surface of the rim, while the ends of the bolts which extend through the clamping plates are provided with nuts. The clamping plates are preferably provided with shoulders or ribs E' which engage the edges of the respective spoke-heads and thereby prevent the spoke-heads from working outwardly with respect to the slots in the corresponding clamping plates.

When it is desired to remove the rim from the wheel the nuts on the bolts which secure the clamping plates to the rim are unscrewed so as to permit the clamping plates to be moved away from the under-surfaces of the spoke-heads. The wheel and rim are then relatively rotatated so that the spoke heads will pass out of the slots in the clamping plates. The rim may then readily be removed from around the ends of the spokes and a new rim located around the ends of the spokes and secured to them relatively rotating the rim and wheel so that the spoke heads will pass into the slots in the clamping plates. The nuts are then tightened on the bolts so that the spoke-heads will be securely held between the inner surface of the rim and the clamping plates.

The clamping plates are preferably so located with respect to the direction in which the wheel normally rotates that the spoke heads will be forced against the inner edge of the slots in the plates. Any danger of the spoke-heads working out of the slots, as for instance when the wheel is rotated in a reverse direction, is prevented by the ribs on the plates.

In Fig. 5 I have illustrated a modification of my invention in which the spoke-heads are radially adjustably secured to the sockets. In Fig. 5 reference character B' indicates one of the sockets on the end of a spoke $a$ while $b'$ indicates the spoke-head carried by the socket. The spoke-head is provided with an exteriorly screw-threaded shank $b^2$ which engages an interiorly screw-threaded sleeve formed concentrically on the socket and extending into the end of the spoke. By adjustably securing the spoke heads to the spokes the length of the spokes may be varied to adapt the same to different sizes of rims. The adjustment of the spoke-heads also facilitates the removal of the rim, and when a rim has been located around the spokes enables the same to be closely engaged by the spoke heads.

By means of my invention it is possible for a vehicle such as an automobile to carry one or more extra rims with fully inflated tires secured around the same, and when a tire is punctured to readily remove its supporting rim from about the wheel and replace the same with one of the extra rims carrying an inflated tire. In this manner it is unnecessary to repair a punctured tire on the road or to detach the same from its rim and substitute a new tire around the rim. The delay and inconvenience incident to a punctured tire are consequently avoided as by my invention a rim with inflated tire thereon may easily and quickly be substituted for a rim the tire around which is punctured.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having now fully described my invention, what I claim as new, and desire to secure by Letters Patent is:

1. The combination of a self sustaining wheel body consisting of a hub having radially projecting spokes thereon, heads on the ends of said spokes, a rim having an inflated pneumatic tire thereon, and radially adjusted clamps on the inner surface of said rim in position to engage and clamp the heads on the spokes against the inner surface of the rim, each of said clamps being provided with an open-ended slot and with a shoulder on one side of the slot on the face adjacent to the rim for the purpose of engaging the side of the head opposite the slot.

2. The combination with a wheel body comprising a hub having spokes radiating therefrom, of heads on the ends of said spokes, a rim surrounding said spokes adjacent to said heads, and a series of clamping plates carried by said rim for engaging with the inner sides of said heads, each of said clamping plates having an open-ended slot for the reception of the spoke and a shoulder extending transversely to the length of said slot on the side of the plate adjacent to the rim for engaging with the corresponding head when the plate is secured to the rim.

3. The combination with a wheel body comprising a hub having spokes radiating therefrom, of a rim surrounding said body, and detachable clamping jaws arranged upon the inner side of the rim for locking the rim to the ends of the spoke, said clamping jaws being arranged to permit the spokes to be entered and removed by rotating the spokes about the axis of the wheel, and means for securing said jaws to the rim and simultaneously clamping the spokes between the jaws and the rim.

4. The combination of a wheel body comprising a hub and spokes, of a rim arranged about the outer ends of the spokes, a series of open jaws arranged upon the inner side of the rim for receiving the ends of the spokes, said spokes having upon the ends shoulders extending transversely to the plane of the wheel and said jaws having on the sides thereof toward the rim shoulders for coöperating with the aforesaid shoulders upon the spokes so as to prevent the displacement of the spokes from the jaws, and means for forcing said jaws toward the rim so as to bring the shoulders thereon in operative relation to the shoulders on the spokes.

In testimony whereof, I sign this specification in the presence of two witnesses.

THOS. B. JEFFERY.

Witnesses:
J. J. YOUNG,
J. M. GAFFNEY.